Nov. 14, 1961 A. ALLARD 3,008,784
CAR TOP CARRIER
Filed March 11, 1959

INVENTOR.
ALMON ALLARD
BY
KENWAY, JENNEY, WITTER & HILDRETH
ATTORNEYS

United States Patent Office 3,008,784
Patented Nov. 14, 1961

3,008,784
CAR TOP CARRIER
Almon Allard, 244 Glen Road, Wilmington, Mass.
Filed Mar. 11, 1959, Ser. No. 798,713
1 Claim. (Cl. 312—198)

This invention relates in general to car top carriers and is particularly directed towards a car top carrier having a detachable cabinet section.

The carrier of my invention includes a platform with a number of storage elements arranged about its margins and enclosing a central storage well. One or more of the marginal storage elements may be detached from the platform to provide access to the well and to make the contents of the removable section more available for use.

The carrier which is the subject of this invention, is of the sort intended to be mounted on the roof of a passenger car, or possibly a panel truck, to add to the available storage space. This carrier is adaptable to a variety of uses, and by reason of the storage well and removable cabinet is a much more flexible affair than those presently available.

Campers find this carrier particularly useful in view of the fact that a large quantity of different size articles may be stored either in the well or in the cabinet section. Cooking materials or other goods that are frequently used may be stored in the removable cabinet.

The carrier may also be used by others to good advantage. For instance, salesmen find the removable cabinet especially convenient for the storing and transporting of samples, since the entire case may be removed and brought to the customer.

Carpenters may utilize the removable cabinet as a tool chest and apply the well to storing large or heavy supplies. These uses are only by way of suggestion for many other applications will appear to those concerned with the art.

It is an object of this invention to provide an improved car top carrier.

Another object is to provide a car top carrier capable of storing an assortment of different size articles in an orderly manner.

Another object of this invention is to improve the accessibility and portability of articles stored in car top carriers.

Figure 1:
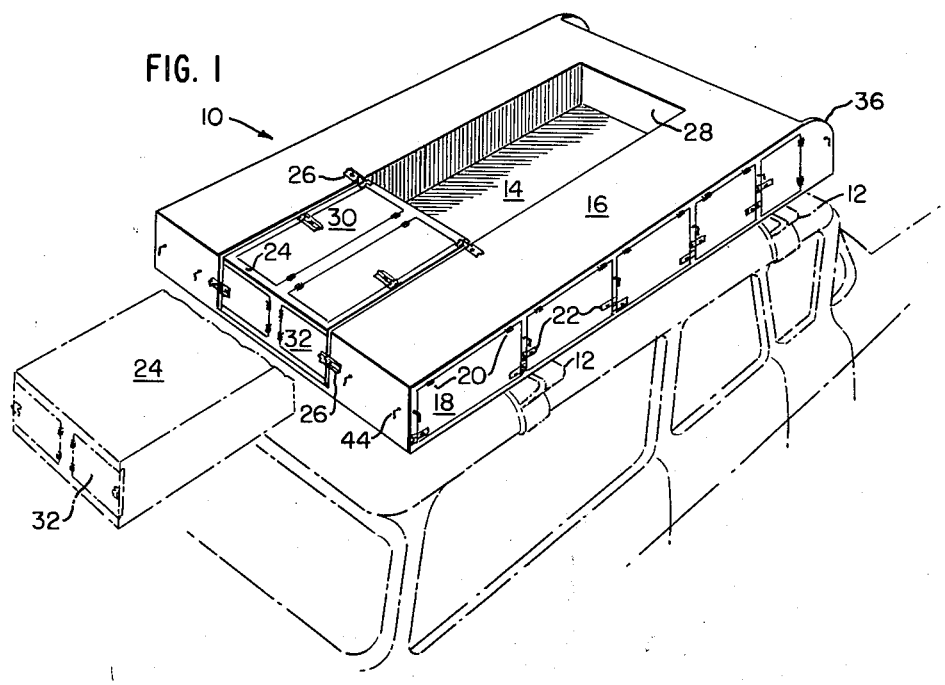
Figure 2:
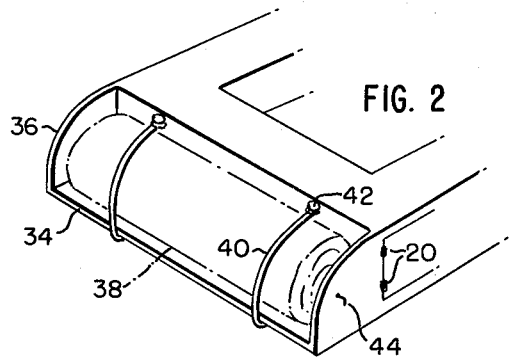

These and other objects and features of the invention will more readily appear from a detailed description of a preferred embodiment of the invention with reference being made to the accompanying drawing in which:

FIG. 1 is a view in perspective, somewhat diagrammatic of a car top carrier made in accordance with my invention, and FIG. 2 is a detail view in perspective of the forward section of the carrier.

In the drawings reference character 10 generally indicates a carrier made according to my invention and mounted to the roof of a station wagon (shown in outline) by way of a pair of spaced, transverse supports 12 of any suitable design. Forming the base of the carrier and secured to the supports 12 is a flat, rectangular platform 14, generally corresponding to the roof of the vehicle in width and length.

An integrated and compartmented storage structure 16 is arranged in a U-shaped fashion about the upper marginal areas of the platform 14, with the legs of the U extending rearwardly as shown herein. Each compartment of the storage structure 16 is provided with a door 18, hinged at 20 and locked by a pair of sliding bolts 22 which may be of the spring-loaded or catch type. It will be noted that all the doors except those for the foremost cabinets are hinged at their tops so that when adjoining cabinets are open the doors swing up and out of the way and do not interfere with one another. The doors for the foremost cabinets are hinged along the side towards the front of the carrier and when open, lay back against the side of the carrier.

Detachably mounted on the rear of the platform between tthe legs of the storage structure 16 is a removable cabinet section 24 held in locked position by sliding bolts 26, similar to those used to secure the doors 18.

The cabinet 24 may be provided with several drawers (not shown) which may be pulled out by opening a rear door 32 or, alternatively, access may be had by way of a top door 30. In either event, the cabinet 24 may be completely removed from the platform by releasing the bolts 26.

The advantages gained by this arrangement are several. First, it is extremely convenient to store in the cabinet 24 articles which are frequently used such as cooking utensils, and so forth, when the carrier is used on camping trips or tools when used by repairmen. The removable section serves as a compact, easily carried chest when detached while in position it serves also to enclose a storage well 28 by completely filling the otherwise open space between the side legs of the storage structure 16.

The storage well 28 as shown herein, is formed in the center of the platform and adapted to store large or odd-shaped objects which could not be fitted into the cabinet section of the carrier.

The well 28 may be conveniently loaded by first detaching the removable cabinet section 24, to provide easy access to the well, loading the well, and then replacing the cabinet section. It will be obvious that with cabinet section 24 in place any materials stored in its well are enclosed by cabinets and cannot shift to any great extent or fall from the carrier.

Across the front of the carrier there is formed a shelf 34 having rounded side portions 36, as best seen in FIG. 2. This shelf is suitable for storing items such as tents, sleeping bags or tarpaulins as indicated by the reference character 38. A number of straps 40, connected to fasteners 42, are supplied to secure the article stored therein. The tent, or whatever else is fastened to the shelf, is easily accessible and may be quickly dismounted by releasing the straps 40.

For additional protection against exposure to the elements a tarpaulin (not shown) may be stretched over the carrier and secured thereto as by cleats 44 which have been provided for that purpose. It will be understood that with a tarpaulin fitted to the carrier wind resistance will be materially reduced by reason of the rounded front portion 36. To further reduce the drag effect of the wind, the top portion of the carrier may taper slightly to the rearward.

The carrier that has been described herein may be fabricated from plywood, aluminum or any number of suitable materials, which preferably should be light in weight, yet sturdy and resistant to weathering. The various hardware fittings should also be of weather-resistant materials such as brass, aluminum, or plated steel.

Many modifications may be made to the carrier without departing from the scope of my invention. For instance, a handle may be added to the detachable cabinet section 24 to enhance its portability. Also, one or more of the several cabinets may be insulated and converted for use as a refrigeration compartment. Many other refinements will appear to those skilled in the art.

Having thus described my invention what I claim and desire to obtain by Letters Patent of the United States is:

A sectional storage carrier for automobile tops, comprising a generally flat rectangular platform, means for mounting said platform to the roof of an automobile, a plurality of fixed cabinets securely mounted in U-shaped formation upon the upper surface of said platform and along the forward and side marginal edges thereof, a removable storage unit mounted on the upper surface of said platform and along the rear marginal edge thereof between the arms of the cabinet formation, said removable unit defining with said cabinets a rearwardly opening central storage well and locking means for securing said unit to said cabinets when said unit is in position to close the open side of the well.

References Cited in the file of this patent

UNITED STATES PATENTS

| | | |
|---|---|---|
| 283,374 | Bufford | Aug. 21, 1883 |
| 986,395 | King | Mar. 7, 1911 |
| 1,351,097 | Cook | Aug. 31, 1920 |
| 2,791,323 | Schreckengost | May 7, 1957 |

FOREIGN PATENTS

| | | |
|---|---|---|
| 134,988 | Great Britain | Dec. 2, 1918 |
| 852,505 | France | Feb. 26, 1940 |